(12) United States Patent
Smith, Jr. et al.

(10) Patent No.: US 8,908,522 B2
(45) Date of Patent: Dec. 9, 2014

(54) TRANSMISSION RATE CONTROL

(75) Inventors: Albert V. Smith, Jr., Richardson, TX (US); Asmita Borlepwar, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 193 days.

(21) Appl. No.: 13/460,606

(22) Filed: Apr. 30, 2012

(65) Prior Publication Data

US 2013/0286845 A1 Oct. 31, 2013

(51) Int. Cl.
*G08C 15/00* (2006.01)
*H04L 12/823* (2013.01)
*H04L 12/819* (2013.01)
*H04L 12/815* (2013.01)

(52) U.S. Cl.
CPC ............... *H04L 47/21* (2013.01); *H04L 47/32* (2013.01); *H04L 47/22* (2013.01)
USPC ........................................................ 370/235

(58) Field of Classification Search
None
See application file for complete search history.

(56) References Cited

U.S. PATENT DOCUMENTS

| | | | |
|---|---|---|---|
| 5,455,820 A * | 10/1995 | Yamada ................... | 370/395.71 |
| 2002/0093910 A1* | 7/2002 | Yazaki et al. ................. | 370/229 |
| 2004/0022246 A1* | 2/2004 | Davies et al. ................. | 370/394 |
| 2007/0076613 A1* | 4/2007 | Malhotra et al. ........... | 370/235.1 |
| 2007/0104103 A1* | 5/2007 | Howe et al. ................. | 370/230.1 |
| 2007/0177626 A1* | 8/2007 | Kotelba ........................ | 370/468 |

* cited by examiner

*Primary Examiner* — Kevin C Harper
(74) *Attorney, Agent, or Firm* — Maschoff Brennan

(57) ABSTRACT

A method may include monitoring data packets at a data transmission channel. The data packets may be identified as nonconforming or as conforming data packets. Data packets may be identified as nonconforming if a data transmission rate would exceed a data rate threshold if the data packets were allowed to continue along the data transmission channel. Data packets may be identified as conforming if a data transmission rate would not exceed the data rate threshold if the data packets were allowed to continue along the data transmission channel. The nonconforming data packets may be retained as retained data packets. The retained data packets may again be identified as nonconforming data packets or conforming data packets after a retaining time. Data packets identified as conforming data packets may be released.

20 Claims, 4 Drawing Sheets

TRANSMISSION RATE CONTROL

FIELD

The embodiments discussed herein are related to controlling data transmission.

BACKGROUND

A communication network may include network elements that route data traffic through the communication network. Some network elements may include a distributed architecture, in which data traffic processing may be distributed among several subsystems of a given network element. Some example subsystems of the network elements may include, but are not limited to, line cards, switches, bridges, distributors, and traffic managers.

A multifunction network element may include the distributed architecture including one or more line cards and/or a bridge. Each of the line cards may include a modular electronic device that may provide network communication functionality. For example, some line cards may include, among other things, an Ethernet switch that may switch traffic through the network element and into a local area network (LAN). Additionally, the line cards may include modules that may process data such as frames or data packets. The data packets or frames may contain information such as a source media access control (MAC) address, a destination MAC address, virtual LAN (VLAN) tags, data, or some combination thereof.

The bridge may similarly include a modular electronic device that provides network communication functionality. For example, the bridge may include, among other things, an Ethernet switch, ports, distributor, and modules to process hash rules and addresses. The modules may include processing resources and a memory configured to separate and map data received at ingress ports to output at egress ports. The data may also be flooded or multicast to all egress ports.

Additionally, communication networks may employ link aggregation. Link aggregation may generally describe the practice of using multiple network cables or ports in parallel to increase link speeds beyond the limits of any single cable or port. In link aggregation, a group or set of ports may be combined and represented as a single logical port to other components of the network system. Various elements of the communication network system may "see" the aggregated ports known as a link aggregation group (LAG) as a single logical communication port.

Additionally, communication networks may employ virtual subports. Virtual subports may be logical or virtual constructs that represent some portion of the bandwidth and/or capacity of an ingress and/or egress port. For example, an ingress port may include a 2.0 Gigabit per second (Gbps) port provisioned into a 1.2 Gbps virtual subport and a 0.8 Gbps virtual subport. The bandwidth of the ingress port may be re-provisioned periodically. Various elements of the communication network may "see" the virtual subports as a single logical communication port. By separating ports into virtual subports, network elements may provide a service interface to external network elements without allocating an entire port to each external network element.

Within network elements, data to be transmitted may generally encounter data rate limitations due to link rates of the ports, LAGs, and/or virtual subports ("links") via which the data will be transmitted. Additionally, data to be transmitted may generally encounter data rate limitations due to hardware limitations and/or limitations in allocated hardware resources of data transmission channels serving the links. However, network elements may receive and/or generate data at rates that exceed the data rate limitations of the data transmission channels and/or links. One solution for handling data that exceeds data rate limitations is to drop the data overflow. Thus, the data is lost or applications that generated the data are prompted to retransmit the dropped data. Lost data may lead to lower data throughput. Prompting applications to retransmit the dropped data may also lead to lower data throughput. For example, prompting applications to retransmit data may cause applications to use processor resources to generate and/or transmit data that was already generated and/or transmitted using processor resources. Prompting applications to retransmit data may also cause a cycle of dropped data that further lowers data throughput. For example, upon being prompted, applications may retransmit data at the same time, and may cause the retransmitted data to again exceed link and/or hardware limits and be dropped. This cycle of dropping data and prompting its retransmission just to drop the retransmitted data may drain processor resources and may result in lower throughput.

To mitigate issues with dropped data, applications may be modified to adapt to processor resources, hardware resources and expected link rates. From the resources and limitations, the application may set a low effective throughput rate. However, such a solution may require modification of the application and/or may lead to under-utilization of network resources.

In transmissions employing connection oriented protocols, data rate control may be handled by the protocol. However, these protocols do not prevent burst transmissions that overrun link rates or hardware buffer limitations. In transmissions employing connectionless protocols, data rate control may be handled at the application layer; thus, each application may be required to handle burst transmissions to prevent overrunning link and/or hardware resources.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method for controlling data transmission rates may include monitoring data packets in a data transmission channel. The data packets may be identified as nonconforming or as conforming data packets. Data packets may be identified as nonconforming if a data transmission rate of the data transmission channel would exceed a data rate threshold of the data transmission channel if the data packets were allowed to continue along the data transmission channel. Data packets may be identified as conforming if the data transmission rate would not exceed the data rate threshold if the data packets were allowed to continue along the data transmission channel. The nonconforming data packets may be retained as retained data packets. The retained data packets may again be identified as nonconforming data packets or conforming data packets after a retaining time. Data packets identified as conforming data packets may be released.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Embodiments of the present invention will be explained with reference to the accompanying drawings.

Figure 1:
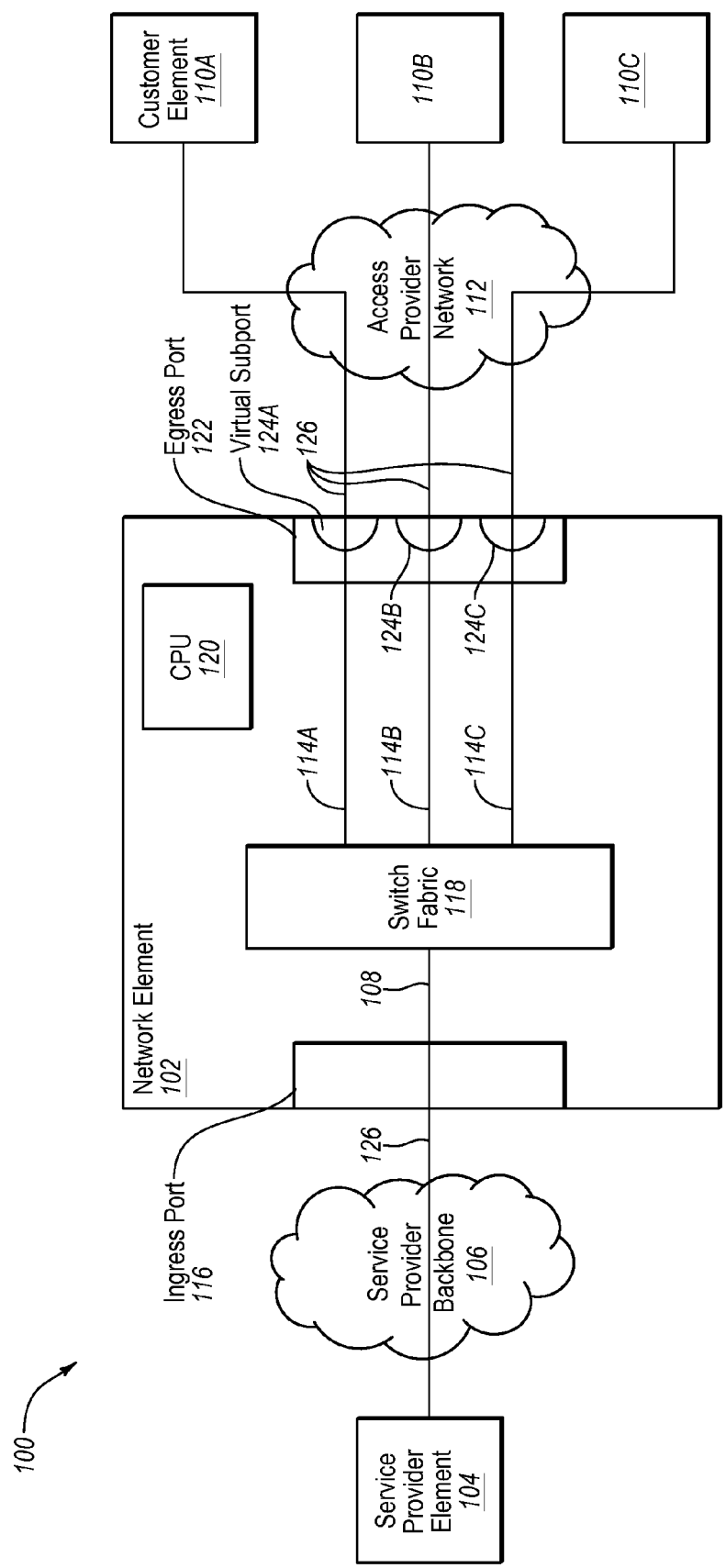
FIG. 1 illustrates a block diagram of an example network in which some embodiments may be implemented.

FIG. 1 illustrates a block diagram of an example network in which some embodiments may be implemented, arranged in accordance with at least some embodiments described herein. Generally, the network 100 may include a network element 102, which may function as an interface between an access provider network 112 and a service provider backbone 106. Thus, the network element 102 may be positioned between two provider networks. Additionally, multiple customer elements 110A, 110B, and 110C (collectively, customer elements 110) may be connected via the access provider network 112 to the network element 102 such that data traffic may be communicated between the customer elements 110 and/or the service provider backbone 106.

The service provider backbone 106 may generally refer to and/or include primary transmission lines over which data traffic may be transmitted. In some embodiments, the service provider backbone 106 may include a connection oriented Ethernet (COE) with a bridge aggregation network. In this and other embodiments, the service provider backbone 106 may provide both COE and bridge aggregation.

The access provider network 112 may be provided by an organization to allow the customer elements 110 to access other customer elements 110 and/or the service provider backbone 106. The access provider network 112 may include a COE access network. Additionally or alternatively, the access provider network 112 may include various other network elements, one or more user network interfaces (UNI) that may be remote (R-UNI), one or more network interface devices, or some combination thereof. An example of the other network elements may include a packet optical networking platform. Additionally, the customer elements 110 may be variously associated with the network element 102 via the other network elements. For example the first customer element 110A may be associated with the network element 102 via, for example, two other network elements while the second customer element 110B may be associated with the network element 102 via, for example, one other network element.

The customer elements 110 may communicate data traffic to the network element 102. Additionally, the customer elements 110 may receive data traffic from the network element 102. In the depicted embodiment, the network 100 includes three customer elements 110, the first customer element 110A, the second customer element 110B, and the third customer element 110C. This depiction is not meant to be limiting. That is, the network 100 may include any number of customer elements 110. In addition in the depicted embodiment, the customer elements 110 are located on one side of the network element 102. However, as may be well understood, some networks 100 may include customer elements 110 associated with the network element 102 through the service provider backbone 106. The customer elements 110 may include any customer premises equipment including but not limited to, a telephone, a router, a switch, a residential gateway, a set-top box, or a home network adaptor.

The network 100 may include transmission media 126 that may connect the customer elements 110, the access provider network 112, the network element 102, the service provider backbone 106, or some combination thereof. Functionally, the transmission media 126 transport one or more signals communicated by network element 102 throughout the network 100. Accordingly, each transmission medium may include any system, device, or apparatus configured to communicatively couple the customer elements 110, the access provider network 112, the network element 102, the service provider backbone 106, or some combination thereof. For example, each transmission medium 126 may include any one or more of an optical fiber, an Ethernet cable, a Ti cable, a Wi-Fi signal, a Bluetooth signal, etc.

The network 100 communicates data, which may be referred to as traffic, data traffic, or data streams, over transmission media. As used herein, "data" means information generated, transmitted, stored, or sorted in the network 100. The data may be transmitted over transmission media in the form of optical or electrical signals configured to represent audio, video, and/or textual data, for example. The data may also be real-time or non-real-time data. The data may be communicated via any suitable communications protocol, including, without limitation, the Open Systems Interconnection (OSI) standard and Internet Protocol (IP).

The network 100 includes the network element 102. In some embodiments, the network 100 may include multiple other network elements (not shown) that may be identical to the network element 102. Additionally, as mentioned above, the network 100 may include various other network elements connected to the network element 102 via the access provider network 112 and/or the service provider network 106.

The network element 102 may include an egress port 122. The egress port 122 may be coupled to the access provider network 112 via one or more transmission media 126. The egress port 122 may include a first virtual subport 124A, a second virtual subport 124B, and/or a third virtual subport 124C (collectively, virtual subports 124).

In this and other embodiments, the egress port 122 includes three virtual subports 124. However, this depiction is not meant to be limiting. Alternately, the egress port 122 may include a single port or may form part of a link aggregation group (LAG). The network element 102 may include multiple egress ports 122 any of which may include multiple virtual subports, may act as a single port, or may form part of a LAG. For example, in some embodiments the network element includes egress ports 122 any or all of which may include about 976 virtual subports 124.

The virtual subports 124 may be associated with one or more of the customer elements 110. As used herein, the term "associated with" may mean the customer elements 110 may transmit data traffic to the egress port 122, which may be processed by the network element 102 as being received at the virtual subports 124 rather than at the egress port 122. Additionally, the term "associated with" may mean the customer elements 110 may receive data traffic from the network element 102, which may be "seen" by the customer element 110 as being sent from the virtual subport 124 rather than from the egress port 122. For example, in this and other embodiments, the first customer element 110A may be associated with the network element 102 at the first virtual subport 124A and the second customer element 110B may be associated with the network element 102 at the second virtual subport 124B. The first customer element 110A may "see" the first virtual subport 124A as essentially an independent physical port. However, the transmission media 126 that physically connects the first customer element 110A to the egress port 122 may not apportion or otherwise separate the data traffic routed to the first virtual subport 124A. Likewise, the second customer element 110B and the third customer element 110C may "see" the second virtual subport 124B and the third virtual subport 124C, respectively, essentially as independent physical ports.

By separating an egress port 122 into virtual subports 124, the network element 102 may provide a remote customer service interface (RCSI) to a customer element 110 without allocating an entire egress port 122 to the customer element 110. That is, with the virtual subports 124, the provision of the RCSIs may not be limited to the number of egress ports 122. For example, if the network element 102 includes about 24 line cards each including about 20 physical ports, the network element 102 may be limited to about 480 RCSIs. However, if each of the about 20 physical ports may be provisioned into as many as about 976 virtual subports, the network element 102 may provide as many as about 46080 RCSIs.

Additionally, the provisioned portions of each egress port 122 may be variable. For example, the network element 102 may include about 24 line cards each including about 20-10 Gbps physical ports. Alternately or additionally, the physical ports may operate at a data rate lower or higher than 10 Gbps. In this and other embodiments, the network element 102 may be limited to about 480 COE interfaces each of which includes a 10 Gbps bandwidth. However, if each of the about 20 physical ports may be provisioned into as many as about 976 virtual subports, each of the virtual subports may be provisioned any portion of the 10 Gbps bandwidth. For example, the first virtual subport of the first physical port may include 1 Gbps of bandwidth, while the second virtual subport on the first physical port may include 9 Gbps of bandwidth. Alternately or additionally, virtual subports may include other rates, for example, 128 kilobits per second (kbps), 1 megabit per second (Mbps), 5 Mbps, 13 Mbps, etc. The overall amount of data traffic the network element 102 may receive may be the same regardless of the number of virtual subports 124.

The network element 102 may include an ingress port 116. The ingress port 116 may be coupled to the service provider backbone via one or more transmission media 126. The ingress port may further be associated with one or more service provider elements 104. Like the egress port 122, the ingress port 116 may include a single port, may form part of a LAG, or may include virtual subports. The network element 102 may include multiple ingress ports 116.

The general flow of data traffic through the network element 102 may include inbound traffic (not shown) over a first data transmission channel 108. The first data transmission channel 108 is depicted as a single data transmission channel. This depiction is not meant to be limiting. Alternately, the first data transmission channel 108 may include multiple data transmission channels. For instance, the first data transmission channel 108 may include multiple data transmission channels associated with virtual subports of the ingress port 116.

The inbound traffic may additionally proceed through a switch fabric 118. Generally, the switch fabric 118 receives the data traffic, determines an intended recipient of the data traffic, and transmits the data traffic such that the data traffic may ultimately reach the intended recipient. The switch fabric 118, as well as other network element 102 components, may employ a central processing unit (CPU) 120 of the network element 102 to perform at least some of its functions. Thus, at the switch fabric 118, the inbound traffic may become outbound traffic (not shown) over one or more of multiple data transmission channels 114A, 114B, and/or 114C (collectively "data transmission channels 114"). The data transmission channels may be associated with, for example, the virtual subports 124.

Figure 2:
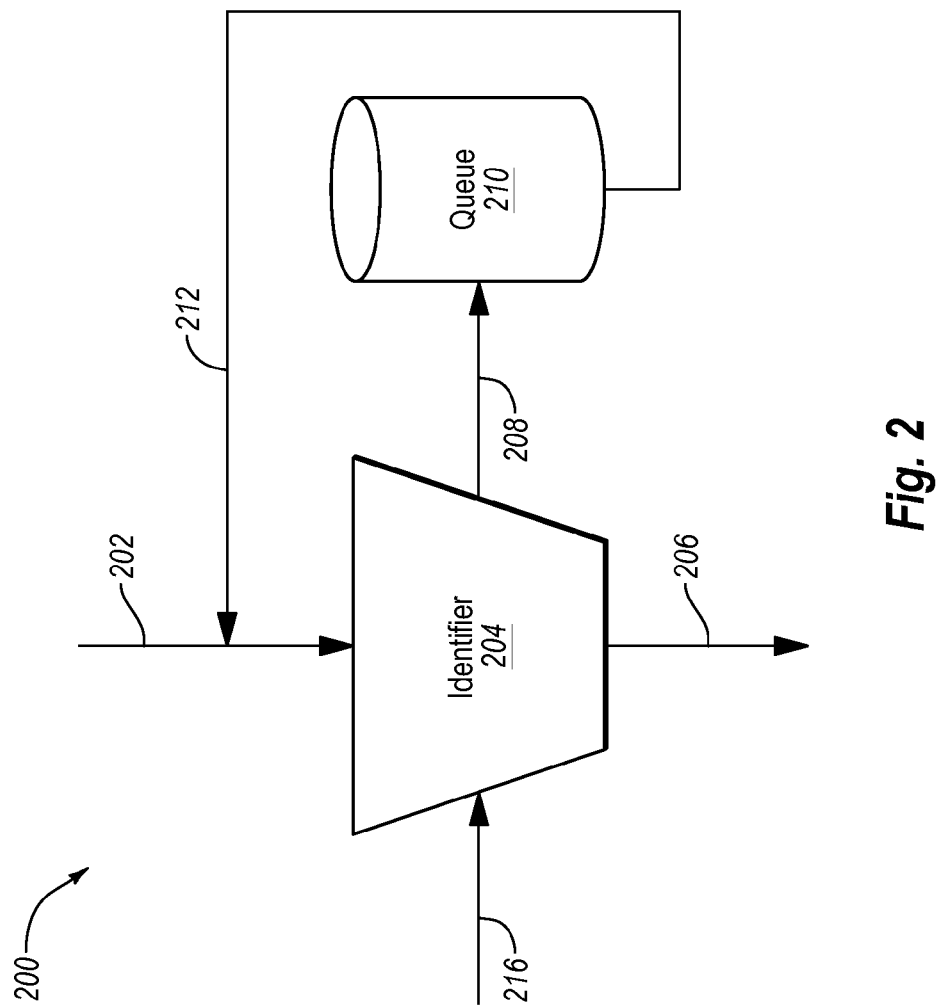
FIG. 2 illustrates a block diagram of an example transmission rate control that may be implemented in the network of FIG. 1.

FIG. 2 illustrates a block diagram of an example transmission rate control 200 that may be implemented in the network of FIG. 1, arranged in accordance with at least some embodiments described herein. For example, the transmission rate control 200 may be implemented by the CPU 120 of FIG. 1. The transmission rate control 200 may monitor data packets in a data transmission channel, such as the data transmission channels 108, 114A, 114B, and/or 114C of FIG. 1. In some embodiments, the data transmission channel may be associated with a virtual subport, such as the virtual subports 124A, 124B, and/or 124C of FIG. 1. In some embodiments, the data transmission channel may be associated with a single port or a LAG.

The transmission rate control 200 may receive incoming data packets 202 from the data transmission channel at an identifier 204. The identifier 204 may identify the data packets as nonconforming data packets or conforming data packets. In some embodiments, the functions of the identifier 204 may be performed by a CPU of a network element, such as the CPU 120 of FIG. 1. Alternately or additionally, in some embodiments, the functions of the identifier 204 may be performed by other processors or hardware of the network element.

In some embodiments, the identifier 204 may identify a data packet as nonconforming if a data transmission rate of the data transmission channel would exceed the data transmission channel's data rate threshold if the data packets were allowed to continue along the data transmission channel. The term "data rate," "data transmission rate," "data rate threshold," "data rate limitation," and the like as used herein should be understood to include "burstiness" (i.e., measures of the unevenness or variations in the data traffic flow). Alternately or additionally, the identifier 204 may identify data packets as conforming data packets if allowing the data packets to continue along the data transmission channel would not exceed the data transmission channel's data rate threshold. In some embodiments, the data rate threshold of the data transmission channel may be based on the link rate of the data transmission channel or the hardware limitations of the data transmission channel. Alternately or additionally, the data rate threshold of the data transmission channel may be based on one or more characteristics of the data packets. For example, the data rate threshold of the data transmission channel may be based on the protocol or application type that generated the data packets, as further described with reference to FIG. 3. Alternately or additionally, the data rate threshold of the data transmission channel may be based on a user setting of the data rate threshold.

In some embodiments, the identifier 204 may identify data packets as nonconforming or conforming data packets using an algorithm such as a leaky bucket algorithm or a token bucket algorithm. However, the identifier 204 is not limited to these algorithms. Rather, the identifier 204 may employ any algorithm, method or system that may allow the identifier 204 to identify data packets as conforming or nonconforming data packets as described herein.

In some embodiments, a leaky bucket algorithm may be used by the identifier 204 to identify data packets as nonconforming or conforming data packets. The leaky bucket algorithm may be based on an analogy of a bucket including a hole such that any water added to the bucket may leak from the bucket at a constant rate until the bucket is empty. The bucket may include a finite capacity. Thus, the bucket may overflow if the rate at which water is added to the bucket exceeds the rate at which water leaks from the bucket for a sufficient period of time.

In a data transmission context, implementing a leaky bucket algorithm may include monitoring data packets in a data transmission channel. Data packets may cause a counter to increment by an amount related to a size of the data packets if the counter would not exceed a maximum value. If the counter may be incremented, the data packet may be allowed to continue along the data transmission channel. If the counter may not be incremented because the counter would exceed its maximum value, the data packet may not be allowed to continue along the data transmission channel. The counter may also decrement at a constant rate unless the counter is already at zero. Thus, a leaky bucket algorithm may enforce limits on data rate, including burstiness.

In some embodiments, a token bucket algorithm may be used by the identifier 204 to identify data packets as nonconforming or conforming data packets. The token bucket algorithm may be based on an analogy of adding tokens to a bucket at a constant rate until the bucket may hold no more tokens. Tokens may be removed from the bucket unless the bucket is empty. Thus, the bucket may empty if the rate at which the tokens are removed exceeds the constant rate at which the tokens are added to the bucket for a sufficient period of time.

In a data transmission context, implementing a token bucket algorithm may include monitoring data packets in a data transmission channel. Data packets may cause a counter to decrement by an amount related to a size of the data packets if the counter would not drop below zero. If the counter may be decremented, the data packet may be allowed to continue along the data transmission channel. If the counter may not be decremented because the counter would drop below zero, the data packet may not be allowed to continue along the data transmission channel. The counter may also increment at a constant rate unless the counter is already at a maximum value. Thus, token bucket algorithms may enforce limits on data rate, including burstiness, in a manner similar to leaky bucket algorithms.

Using leaky bucket algorithms, token bucket algorithms, or other systems or methods, the identifier 204 may identify data packets as conforming or nonconforming data packets. The identifier 204 may allow data packets identified as conforming data packets to continue along the data transmission channel as data packets 206 that may be output to the data transmission channel from the identifier 204. Transmission rate controls 200 that include or implement leaky bucket or token bucket algorithms may be described as "elastic buckets."

In some embodiments, the identifier 204 may retain nonconforming data packets as data packets 208 that may be output to a queue 210. In some embodiments, the queue 210 may be located at a processor memory. For example, the retained data packets may be stored at a CPU cache, random access memory (RAM), or other memory associated with a CPU of a network element.

After a retaining time, the retained data packets may again be identified as nonconforming data packets or conforming data packets, which may be depicted as returning the retained data packets 212 to be again identified by the identifier 204. In some embodiments, the retaining time may be related to the algorithms, methods, and/or systems for identifying the data packets as nonconforming or conforming. In some embodiments, the retaining time may be related to the rate at which a leaky bucket algorithm or a token bucket algorithm decrements or increments the algorithm counter. For example, the retained data packets may again be identified as nonconforming or conforming data packets when the counter of a token bucket algorithm has been incremented. Alternately or additionally, the retaining time may include a set time. In an example embodiment, retained data packets may again be identified as nonconforming data packets or conforming data packets at a time when an algorithm counter is scheduled to increment by an incrementing amount. Retained data packets that would cause the algorithm counter to decrement less than the incrementing amount may be output to the data transmission channel. The algorithm counter may then be incremented by an adjusted incrementing amount that takes into account the output data packets.

In some embodiments, the data packet order of the data transmission may be maintained. For example, the order of the output data packets 206 may match the order of the input data packets 202. The queue 210 may return the retained data packets 212 in the same order they were retained 208. In some embodiments, and during periods when the queue 210 contains one or more retained data packets, the identifier 204 may identify all incoming data packets 202 as nonconforming so as to ensure the order of the output data packets 206 matches the order of the input data packets 202.

In some embodiments, the data rate threshold of the identifier 204 may be changed to an updated data rate threshold. For example, in identifiers employing a leaky bucket algorithm, the counter maximum (the size of the bucket) and the decrementing rate of the counter (the rate of the leak) may be changed. In other algorithms, other parameters may be changed.

In these and other embodiments, the identifier 204 may receive update instructions 216 which may prompt the identifier 204 to update its data rate threshold. In some embodiments, the update instructions 216 may originate from a hardware status of the data transmission channel. In some embodiments, hardware buffers may provide a buffer and/or a first-in-first-out (FIFO) status to the identifier 204 such that the data rate threshold may be updated based on the buffer and/or FIFO status. For example, if a hardware buffer and/or FIFO status indicates that the buffer and/or FIFO are almost full, the data rate threshold may be lowered such that the data rate of the output data packets 206 is slower.

In some embodiments, the updated data rate threshold may be based on a link rate, or more particularly on an updated link rate, of the data transmission channel. For example, the network element may re-provision the link rate of a virtual subport associated with the data transmission channel and update the data rate threshold of the identifier 204 to match the new link rate. In some embodiments, the data rate threshold may be updated to tune the identifier 204 to the data rate of the data transmission channel. For example, a virtual subport associated with the data transmission channel may be provisioned a link rate of one Mbps, but in actual implementation, the data transmission channel may only allow 998 kbps. Using buffer and/or FIFO status and other hardware and/or software feedback, the identifier may tune the data rate threshold to match the data rate actually allowed by the data transmission channel.

In some embodiments, the updated data rate threshold may be based on one or more characteristics of the data packets. For example, the updated data rate threshold may be based on an application generating the data packets, or a protocol of the data packets, as further described with reference to FIG. 3. In some embodiments, the updated data rate may be set by a user of the network element. For example, an operator of the network element may set the data rate threshold of the identifier 204.

Figure 3:
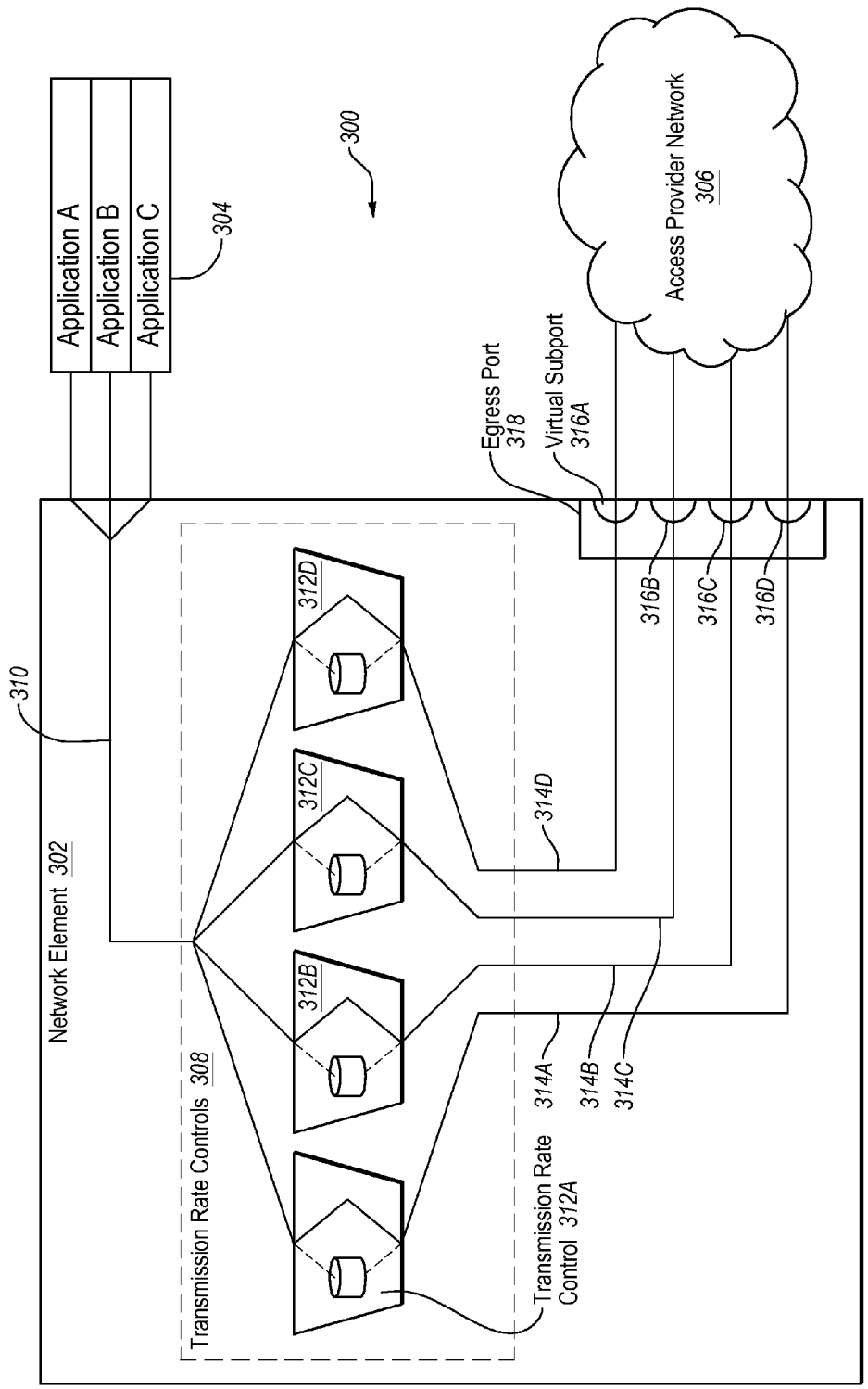
FIG. 3 illustrates an example network element that may be included in the network of FIG. 1 and that may include transmission rate controls at multiple data transmission channels.

FIG. 3 illustrates an example network element 302 that may be included in the network of FIG. 1 and that may include transmission rate controls 312A, 312B, 312C, and 312D (collectively "transmission rate controls 308") at multiple data transmission channels 314A, 314B, 314C, and 314D (collectively "data transmission channels 314"), arranged in accordance with at least some embodiments described herein. The data transmission channels 314 may be associated with virtual subports 316A, 316B, 316C, and 316D (collectively "virtual subports 316") included in an egress port 318. The network element 302 may generally correspond to the network element 102 of FIG. 1. The transmission rate controls 312A, 312B, 312C, and 312D may generally correspond to the transmission rate control 200 of FIG. 2. The data transmission channels 314, virtual subports 316, and egress port 318 may generally correspond to the data transmission channels 114, virtual subports 124, and egress port 122 of FIG. 1, respectively.

The network element 302 may be part of a network 300 including an access provider network 306. The network 300 and access provider network 306 may generally correspond to the network 100 and access provider network 112 of FIG. 1. One or more applications 304 may generate inbound traffic 310. The inbound traffic 310 may generally correspond to the inbound traffic 108 of FIG. 1. In some embodiments, the one or more applications 304 may be located within the network element 302. In some embodiments, the one or more applications 304 may be located at a service provider element, such as the server provider element 104 of FIG. 1. The one or more applications 304 may be located at one or more servers connected to the network element 302 through transmission media. The data generated by the one or more applications 304 may be communicated via any suitable communications protocol, including, without limitation, the OSI standard and IP.

The amount of data generated by the one or more applications 304 may be variable based on the processor resources available to the applications 304. Thus, the applications 304 may generate and transmit data at a rate that would exceed the data rate threshold of the data transmission channel that would carry the generated data. The transmission rate controls 308 may bring the data rate within the data rate threshold without dropping data packets and, in some embodiments, without altering the transmission order of the data packets. In some embodiments, the transmission rate controls 308 may be configured to control the data rate of data generated and transmitted by a particular one of the applications 304, for example, Application C. In some embodiments, the transmission rate controls 308 may be configured to control the data rate of data transmitted using a particular protocol, for example, Simple Network Management Protocol (SNMP).

Controlling transmission rates using the transmission rate controls 308 may offer some advantages in some embodiments. For example, compliance with data rate thresholds may be moved away from applications 304 such that controls related to compliance may be omitted from the applications 304. Applications 304 may use available processor resources without concern for data rate thresholds, resulting in an increase in overall system efficiency. Dropped data and application retransmission due to exceeded data rate thresholds may be eliminated or at least reduced, and may result in a relative increase in throughput and/or performance of the network element 302. Furthermore, the data rate thresholds may be updated and tuned by the network element 302. The transmission rate controls 308 may also be implemented by a CPU of the network element 302, which may allow for a cost-effective data rate control; particularly when compared to implementing similar controls using field-programmable gate arrays (FPGA) or other hardware solutions.

Figure 4:
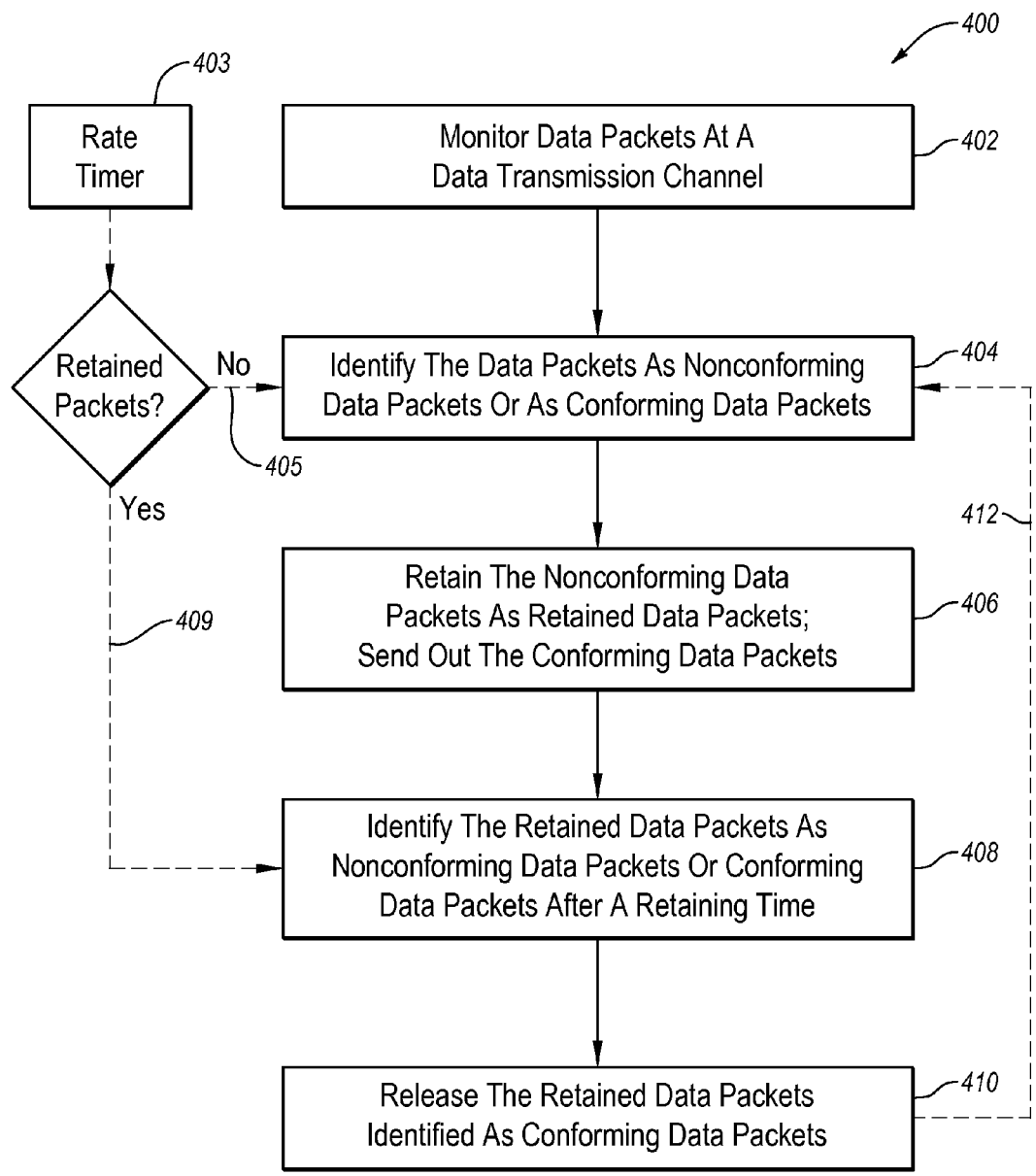
FIG. 4 is a flowchart of an example method for controlling data transmission rates, all arranged in accordance with at least some embodiments described herein.

FIG. 4 is a flowchart of an example method for controlling data transmission rates, arranged in accordance with at least some embodiments described herein. The method 400 may be implemented, in some embodiments, by a network, such as the networks 100, 300 of FIGS. 1 and 3. The method 400 may be implemented by a network element, such as the network elements 102, 302 of FIGS. 1 and 3. In some embodiments, a CPU of a network element, such as the CPU 120 of the network element 102, may perform operations for controlling data transmission rates in the network as represented by one or more of blocks 402, 404, 406, 408, and/or 410 of the method 400. Although illustrated as discrete blocks, various blocks may be divided into additional blocks, combined into fewer blocks, or eliminated, depending on the desired implementation.

The method 400 may begin at block 402, in which data packets may be monitored in a data transmission channel. The data transmission channel may generally correspond to the data transmission channels 114 of FIG. 1. In some embodiments, the data packets may be generated by one or more applications. The data packets and the one or more applications may generally correspond to the data packets and applications 304 as described with reference to FIG. 3, for example.

In block 404, the data packets may be identified as nonconforming data packets or as conforming data packets. Identifying the data packets as nonconforming data packets or conforming data packets may generally correspond to identifying data packets as nonconforming or conforming data packets as described with reference to FIG. 2, for example. In some embodiments, data packets may be identified as nonconforming data packets if a data transmission rate of the data transmission channel would exceed a data rate threshold of the data transmission channel if the data packets were allowed to continue along the data transmission channel. Conversely, data packets may be identified as conforming data packets if the data transmission rate would not exceed the data rate threshold if the data packets were allowed to continue along the data transmission channel. In some embodiments, identifying data packets as conforming data packets or nonconforming data packets may include applying a leaky bucket algorithm. Alternately, identifying data packets as conforming data packets or nonconforming data packets may include applying a token bucket algorithm. In some embodiments, a rate timer 403 may provide information to be used in identifying nonconforming or conforming data packets. For example, in embodiments employing a token bucket algorithm, the rate timer may be used to increment the counter. The amount the counter is incremented and the time between incrementings may be determined by the data rate threshold.

In some embodiments, the counter may be incremented at a regular time interval when no packets are being retained 405.

In block 406, the nonconforming data packets may be retained as retained data packets. Conversely, conforming data packets may be allowed to continue along the data transmission channel. Retaining data packets may include retaining data packets as described with respect to FIG. 2 above. Retaining the nonconforming data packets may prevent the data transmission rate from exceeding the data rate threshold. In some embodiments, the nonconforming data packets may be retained by a processor memory. For example, the retained data packets may be retained by a processor memory of a processor performing the method 400.

In block 408, the retained data packets may again be identified as nonconforming data packets or conforming data packets after a retaining time. Identifying the retained data packets as nonconforming data packets or conforming data packets may include identifying retained data packets as conforming or nonconforming data packets as described with reference to FIG. 2. In some embodiments, the retaining time may be based on the time interval used by the rate timer 403 to increment or decrement a counter used in a token bucket or leaky bucket algorithm. For instance, in methods that employ a token bucket algorithm, the retained data packets may again be identified as nonconforming or conforming data packets at the time or times the counter would normally be incremented. In methods that employ a leaky bucket algorithm, the retained data packets may again be identified as nonconforming or conforming data packets at the time or times the counter would normally be decremented. In some embodiments, identifying the retained data packets as nonconforming or conforming may be performed by comparing the counter incrementation amount against the amount the counter would be decremented upon releasing the retained packet(s) 409. In some embodiments, if the retained data packet(s) would cause the counter to decrement less than the counter would be incremented, the retained data packets may be identified as conforming and released as shown in block 410. In some embodiments, releasing retained data packets may include releasing retained data packets as described with reference to FIG. 2. In some embodiments, the counter may be incremented by an amount adjusted to account for released data packets 412.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 400 may be performed such that the order of the data packets is maintained. Maintaining the order of the data packets may include maintaining the order of data packets as described with reference to FIG. 2. In some embodiments, retained data packets may be released in the same order the data packets were retained. In embodiments that maintain the order of the data packets, incoming data packets may be identified as nonconforming and retained if one or more data packets are currently being retained.

In some embodiments, the method 400 may further include changing the data rate threshold to an updated data rate threshold. Changing the data rate threshold may include changing the data rate threshold as described with reference to FIG. 2. In some embodiments, the updated data rate threshold may be based on hardware limitations of the data transmission channel. Alternately or additionally, the updated data rate threshold may be based on a link rate of the data transmission channel. Alternately or additionally, the updated data rate threshold may be based on the application generating the data packets. For example, the updated data rate may be based on the identity of the application, the type of application, or some other characteristic or characteristics of the application.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including RAM, read-only memory (ROM), electrically erasable programmable read-only memory (EEPROM), compact disc read-only memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method for controlling data transmission rates, the method comprising:

monitoring data packets in a data transmission channel;

identifying the data packets as nonconforming data packets or as conforming data packets based at least in part on a transmission rate control algorithm counter having a minimum counter value and a maximum counter value, including:
    identifying a first one or more of the data packets as nonconforming data packets in response to determining that a data transmission rate of the data transmission channel would exceed a data rate threshold of the data transmission channel if the first one or more of the data packets were allowed to continue along the data transmission channel, and
    identifying a second one or more of the data packets as conforming data packets in response to determining that the data transmission rate would not exceed the data rate threshold if the second one or more of the data packets were allowed to continue along the data transmission channel,
retaining the nonconforming data packets as retained data packets;
identifying the retained data packets as nonconforming data packets or conforming data packets after a retaining time;
releasing the retained data packets identified as conforming data packets;
receiving a hardware status of the data transmission channel; and
changing the data rate threshold to an updated data rate threshold based at least in part on the hardware status, including at least one of:
    changing the maximum counter value of the transmission rate to an updated maximum counter value, and
    changing an adjustment rate of the transmission rate control algorithm counter to an updated adjustment rate.

2. The method of claim 1, wherein the data packets in the data transmission channel are transmitted in a data packet transmission order, and the data packet transmission order is preserved.

3. The method of claim 1, wherein the hardware status of the data transmission channel is provided by a hardware buffer and includes at least one of: a buffer status, and a first-in-first-out (FIFO) status.

4. The method of claim 1, wherein the updated data rate threshold is further based on a transmission protocol of the data packets.

5. The method of claim 1, wherein the updated data rate threshold is further based on an application generating the data packets.

6. The method of claim 1, wherein identifying data packets as conforming data packets or nonconforming data packets includes applying a leaky bucket algorithm that includes the transmission rate control algorithm counter.

7. The method of claim 1, wherein identifying data packets as conforming data packets or nonconforming data packets includes applying a token bucket algorithm that includes the transmission rate control algorithm counter.

8. A network element comprising:
an egress interface; and
a plurality of data transmission channels configured to transmit data packets to the egress interface, each of the plurality of data transmission channels including a transmission rate control configured to:
    monitor data packets in the respective data transmission channel,
    identify data packets in the respective data transmission channel as nonconforming data packets or as conforming data packets, including:
        identifying a first one or more of the data packets as nonconforming data packets in response to determining that a data transmission rate of the respective data transmission channel would exceed a data rate threshold of the respective data transmission channel if the first one or more of the data packets were allowed to continue along the data transmission channel, and
        identifying a second one or more of the data packets as conforming data packets in response to determining that the data transmission rate would not exceed the data rate threshold if the data packets were allowed to continue along the data transmission channel,
    retain the nonconforming data packets as retained data packets,
    identify the retained data packets as nonconforming data packets or conforming data packets after a retaining time,
    release the retained data packets identified as conforming data packets;
    receive a hardware status of the data transmission channel; and
    change the data rate threshold to an updated data rate threshold based at least in part on the hardware status and a transmission protocol of the data packets.

9. The network element of claim 8, wherein the transmission rate control is further configured to preserve a data packet transmission order of the data packets.

10. The network element of claim 8, wherein the transmission rate control is further configured to:
identify the data packets as nonconforming data packets or as conforming data packets based at least in part on a transmission rate control algorithm counter having a minimum counter value and a maximum counter value, and
change the data rate threshold to the updated data rate threshold via changing at least one of: the maximum counter value to an updated maximum counter value, and an adjustment rate of the transmission rate control algorithm counter to an updated adjustment rate.

11. The network element of claim 8, wherein the hardware status of the data transmission channel is provided by a hardware buffer and includes at least one of: a buffer status, and a first-in-first-out (FIFO) status.

12. The network element of claim 8, wherein the transmission rate control is further configured to change the data rate threshold based on an application that generates the data packets.

13. The network element of claim 8, wherein the transmission rate control is configured to identify data packets as conforming data packets or nonconforming data packets using at least one of: a leaky bucket algorithm, and a token bucket algorithm.

14. The network element of claim 8, further comprising a central processing unit (CPU), wherein the transmission rate control is implemented by the CPU.

15. The network element of claim 14, further comprising a CPU memory, wherein the retained data packets are retained at the CPU memory.

16. A processor configured to execute computer instructions to cause a system to perform operations for controlling data transmission rates for a plurality of data transmission channels, the operations for each of the plurality of data transmission channels comprising:

monitoring data packets at the respective data transmission channel, the data packets transmitted over the respective data transmission channel in a transmission order;

identifying the data packets as nonconforming data packets or as conforming data packets based at least in part on a transmission rate control algorithm counter of a transmission data control algorithm having a minimum counter value, a maximum counter value, and an adjustment rate, including:

identifying a first one or more of the data packets as nonconforming data packets in response to determining that a data transmission rate of the respective data transmission would exceed a data rate threshold of the respective data transmission channel if the first one or more of the data packets were allowed to continue along the respective data transmission channel, and identifying a second one or more of the data packets as conforming data packets in response to determining that the data transmission rate would not exceed the data rate threshold for the respective data transmission channel if the second one or more of the data packets were allowed to continue along the respective data transmission channel, retaining the nonconforming data packets at a processor memory as retained data packets;

identifying the retained data packets as nonconforming data packets or conforming data packets after a retaining time;

releasing the retained data packets identified as conforming data packets;

preserving the data packet transmission order;

receiving a hardware status of the data transmission channel provided by a hardware buffer, the hardware status including at least one of: a buffer status, and a first-in-first-out (FIFO) status; and changing the data rate threshold to an updated data rate threshold based at least in part on the hardware status, including at least one of:

changing the maximum counter value to an updated maximum counter value, and changing the adjustment rate to an updated adjustment rate.

17. The processor of claim 16, wherein changing the data rate threshold to the updated data rate threshold is further based on at least one of: a transmission protocol of the data packets, and an application generating the data packets transmitted by the respective data transmission channel.

18. The processor of claim 16, wherein the transmission rate control algorithm includes a leaky bucket algorithm and wherein changing the maximum counter value to the updated maximum counter value includes changing a bucket size of the leaky bucket algorithm, and changing the adjustment rate to the updated adjustment rate includes changing a leak rate of the leaky bucket algorithm.

19. The processor of claim 16, wherein the transmission rate control algorithm includes a token bucket algorithm and wherein changing the maximum counter value to the updated maximum counter value includes changing a bucket size of the token bucket algorithm, and changing the adjustment rate to the updated adjustment rate includes changing a fill rate of the token bucket algorithm.

20. A method for controlling data transmission rates, the method comprising:

monitoring data packets in a data transmission channel;

identifying the data packets as nonconforming data packets or as conforming data packets, including:

identifying a first one or more of the data packets as nonconforming data packets in response to determining that a data transmission rate of the data transmission channel would exceed a data rate threshold of the data transmission channel if the first one or more of the data packets were allowed to continue along the data transmission channel, and identifying a second one or more of the data packets as conforming data packets in response to determining that the data transmission rate would not exceed the data rate threshold if the second one or more of the data packets were allowed to continue along the data transmission channel, retaining the nonconforming data packets as retained data packets;

identifying the retained data packets as nonconforming data packets or conforming data packets after a retaining time;

releasing the retained data packets identified as conforming data packets;

receiving a hardware status of the data transmission channel; and changing the data rate threshold to an updated data rate threshold based at least in part on the hardware status and a transmission protocol of the data packets.

\* \* \* \* \*